Figure 1:
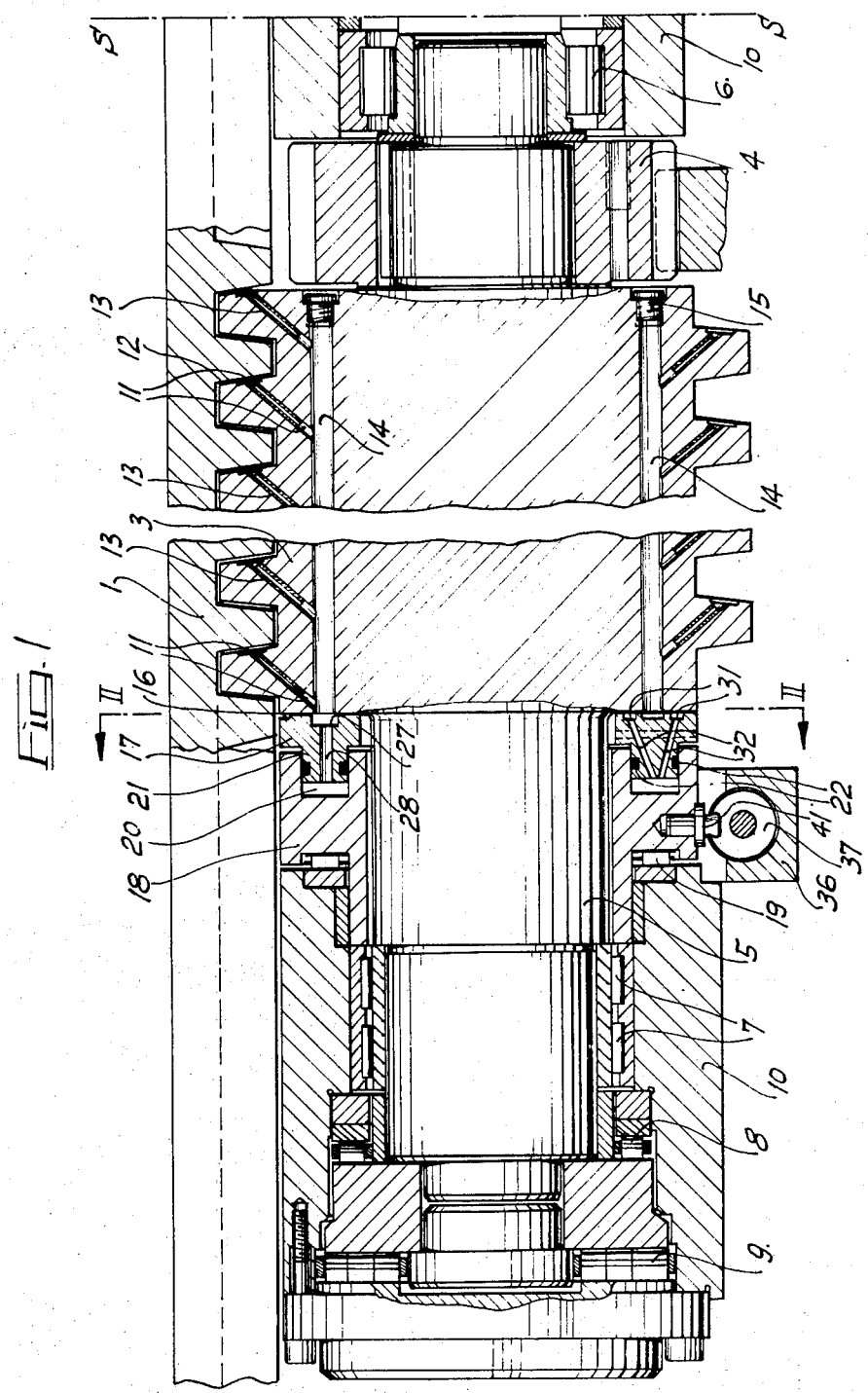

United States Patent [19]
Neugebauer

[11] 3,789,956
[45] Feb. 5, 1974

[54] HYDROSTATIC LUBRICATING DEVICE FOR THE MESHES OF CYLINDER WORMS AND A WORM RACK

[75] Inventor: Heinz Neugebauer, Weidach near Coburg, Germany

[73] Assignee: Werkzeugmaschinenfabrik Adolf Waldrich Coburg, Coburg/Bay., Germany

[22] Filed: Apr. 3, 1972

[21] Appl. No.: 240,526

[30] Foreign Application Priority Data
Apr. 14, 1971 Germany............................ 2118033

[52] U.S. Cl.................. 184/6.12, 74/424.6, 74/468
[51] Int. Cl.......................... F01m 1/00, F16n 17/06
[58] Field of Search. 184/6.12, 6.14; 74/468, 424.6, 74/409

[56] References Cited
UNITED STATES PATENTS
3,454,136  7/1969  Stark.................................. 184/6.12
3,365,913  1/1968  Shields............................... 184/6.12
3,415,138  12/1968 Rumbarger........................ 74/424.6
3,323,385  6/1967  Revitt................................... 74/468

FOREIGN PATENTS OR APPLICATIONS
1,111,685  5/1968  Great Britain
1,273,289  12/1968 Germany Primary Examiner—Manuel A. Antonakas
Attorney, Agent, or Firm—Woodhams, Blanchard and Flynn

[57] ABSTRACT

A hydrostatic lubricating device for lubricating the teeth between a worm and a worm rack. The teeth are supplied with pressurized oil through passageways which are distributed over the circumference of the worm and open outwardly at the flanks.

9 Claims, 5 Drawing Figures

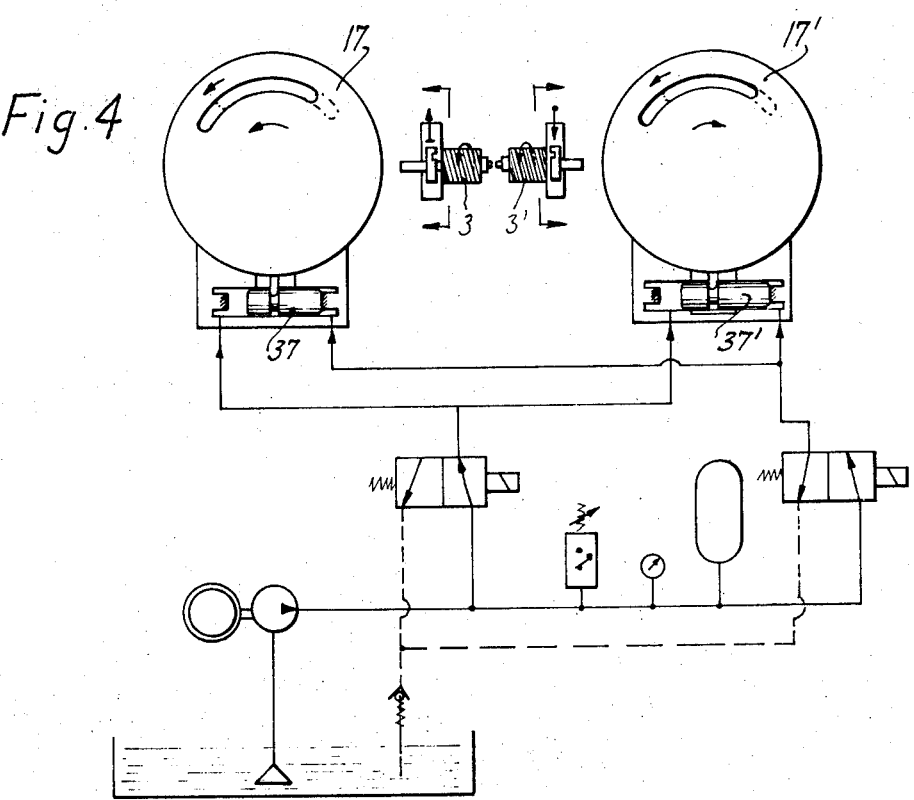

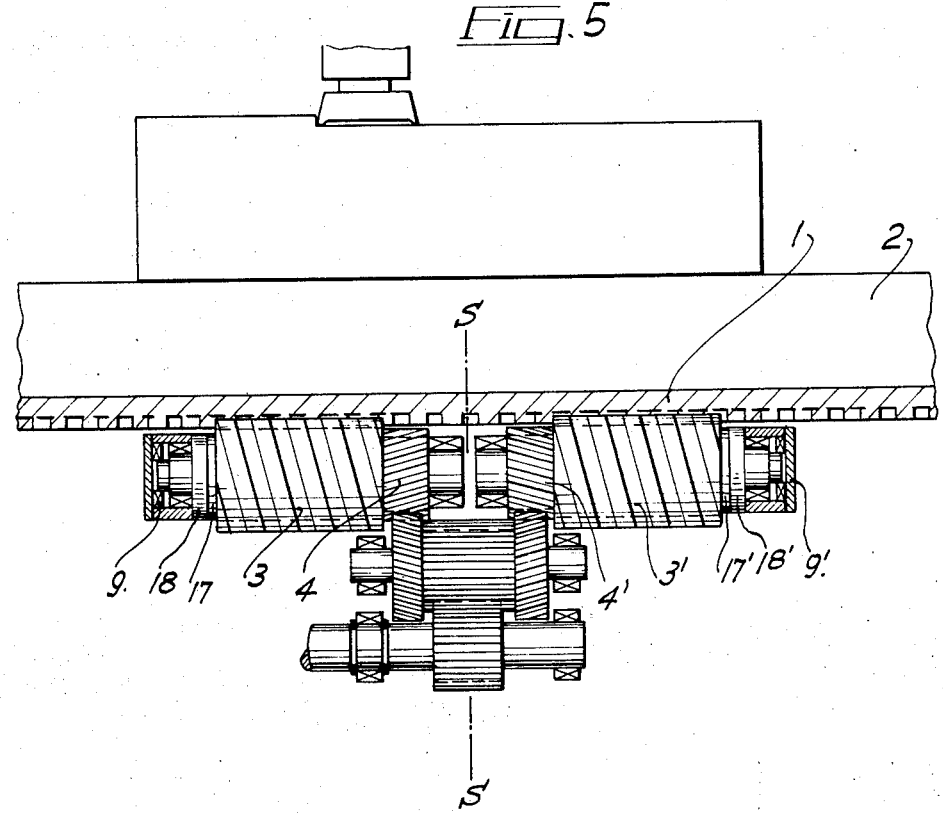

HYDROSTATIC LUBRICATING DEVICE FOR THE MESHES OF CYLINDER WORMS AND A WORM RACK

The invention relates to a hydrostatic lubricating device for the meshes of at least one cylinder worm and a worm rack, where the meshes are supplied with lubricating oil under pressure via lubricating-oil borings which are uniformly distributed over the circumference of the worm and open up into its flanks, and the worm has several concentric distributor channels which are connected to the borings opening up at one flank or the other flank, and distributor bodies are provided at least at one of the two fronts of the worm and are axially supported by the gear box, each of these distributor bodies having a distributor groove which extends over a limited sector of the body and opens towards the front of the worm, and a filling groove extending over the remaining sector of dial, which are in communication with the lubricating oil supply through axial borings.

With such a known (from GB–PS 1,111,685) hydrostatic lubricating device, the distributor bodies are rigidly arranged in the bearing caps at both ends of the worm shaft, which are connected to the gearbox. A connection is established between the front faces of the worm shaft and the paraxial distributor channels in the worm itself via several concentric or radial lubricating-oil channels. The distributor groove of every distributor body is surrounded by a circumferential joint of flexible material such as, e.g., rubber. These circumferential joints are necessary, on the one hand, because, due to the production tolerances occurring, it cannot be ensured that the distributor bodies rigidly mounted in the gear box rest closely against the front surfaces of the worm shaft without, nevertheless, hindering a rotary motion thereof, and, on the other hand, because the length of the worm shaft may expand or contract under the influence of temperature differences. However, such circumferential joints are highly problematic because of the rapid rotary motion between the worm shaft and the distributor body. The circumferential joints consisting of flexible material continuously slide past the edges of the lubricating-oil channels, which must be as sharp as possible. The circumferential joints are therefore subjected to strong wear and tear. Their sealing effect deteriorates rapidly and replacement becomes soon necessary. With large and expensive machine tools for which the hydrostatic lubricating devices are primarily intended, interruptions of operation for the sole purpose of replacing a few circumferential joints are not acceptable. Even less so, because this work is hardly possible without calling on the skilled servicing personnel of the supplier of the machines. Moreover, the dust from the circumferential joints may block the lubricating-oil channels and in this case render expensive microfilter devices in the oil supply system illusory. Finally, very narrow tolerances must be observed for the gearbox, the bearing caps and the worm shaft, in spite of the circumferential joint, in order that the slot between the front faces of the worm shaft and the distributor bodies may not become too large or too small. Moreover, the necessary provision of additional concentric lubricating-oil channels in the worm shaft requires increased production expenditure. Since the lubricating-oil channels are arranged in the worm shaft on a smaller diameter, they can only be provided in a limited number. On the other hand, a greater number of concentric lubricating-oil channels is desirable, in order to achieve the steadiest possible hydrostatic lubrication.

The invention is based on the task of providing a hydrostatic lubricating device of the construction mentioned above, where the distributor bodies are pressed in all states of operation uniformly against the front faces of the worm, the parts being subjected to a low wear and tear and the device therefore operating with a high degree of safety over a long period of time, virtually without being serviced.

The invention is characterised by a. a distributor body designed as a distributor ring which is arranged between the thrust bearing and the worm concentrically to the worm shaft and which is pressed against a front face which is recessed in relation to the worm shaft;

b. an annular holding body which concentrically surrounds the worm shaft and is axially supported by the gearbox and which has an annular groove in which the distributor ring engages by means of a ring lug arranged on its back side, so that it is axially slidable and sealed.

c. several cap springs provided between the ring groove and the ring lug;

d. the arrangement of at least one of the axial boring between the ring groove and the distributor groove provided on the front side of the distributor ring;

e. at least one further boring between the ring groove and at least one relief groove extending concentrically to the filling groove over the section of dial of the latter.

Due to the use of an axially shiftable distributor ring which is pressed against the front face of the worm by spring tension as well as by oil pressure, the distributor ring is always in sealing contact. Production tolerances as well as differences in length caused by varying thermal expansion are compensated by the axially shiftable distributor ring. Consequently, flexible circumferential joints between the distributor ring and the front face of the worm can be dispensed with, and the new hydrostatic lubricating device has a high operational safety and a long life. A particularly uniform contact of the distributor ring is achieved by the special arrangement of distributor groove, filling groove and relief groove, as will be explained further below in greater detail. The uniform contact of the distributor ring also substantially relieves the thrust bearing. This must be regarded as a further advantage, because the load capacity of the main thrust bearing is constructively very limited, due to the determination of a specific maximal outer diameter which must be a little smaller than the thread core diameter of the worm. Expensive hydrostatic thrust bearings are therefore also obviated. Furthermore, the distributor groove and the filling groove are arranged on a comparatively great diameter which is slightly smaller than the thread core diameter of the worm. A great number of concentric distributor channels can be provided on such a great diameter. The greater the number of concentric distributor channels, the more uniform is the hydrostatic lubrication. By the special arrangement of one or more relief grooves concentrically to the filling groove, there is not only achieved a uniform contact of the ring over the whole circumference; a separate supply of lubricating oil to the filling groove under a lower pressure is also obviated. The relief groove and the filling groove are radially arranged at such a distance that lubricating oil can pass through the lubricating slot from the relief groove into the filling groove in a proportion sufficient to keep the lubricating-oil channels of those sections of the worm thread which are not engaged in the worm rack, filled with oil.

Further embodiments of the invention are characterised in the subclaims.

In the following, the invention will be explained in greater detail with the aid of an exemplified embodiment illustrated in the drawing.

Figure 3:
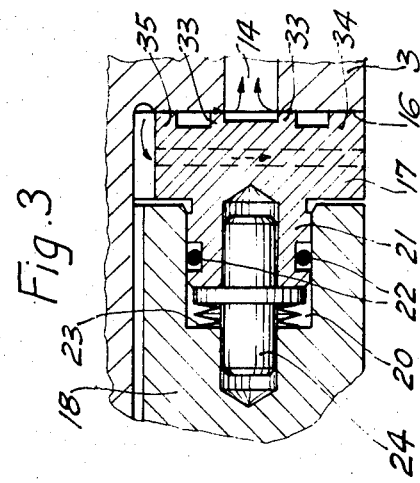
Figure 2:
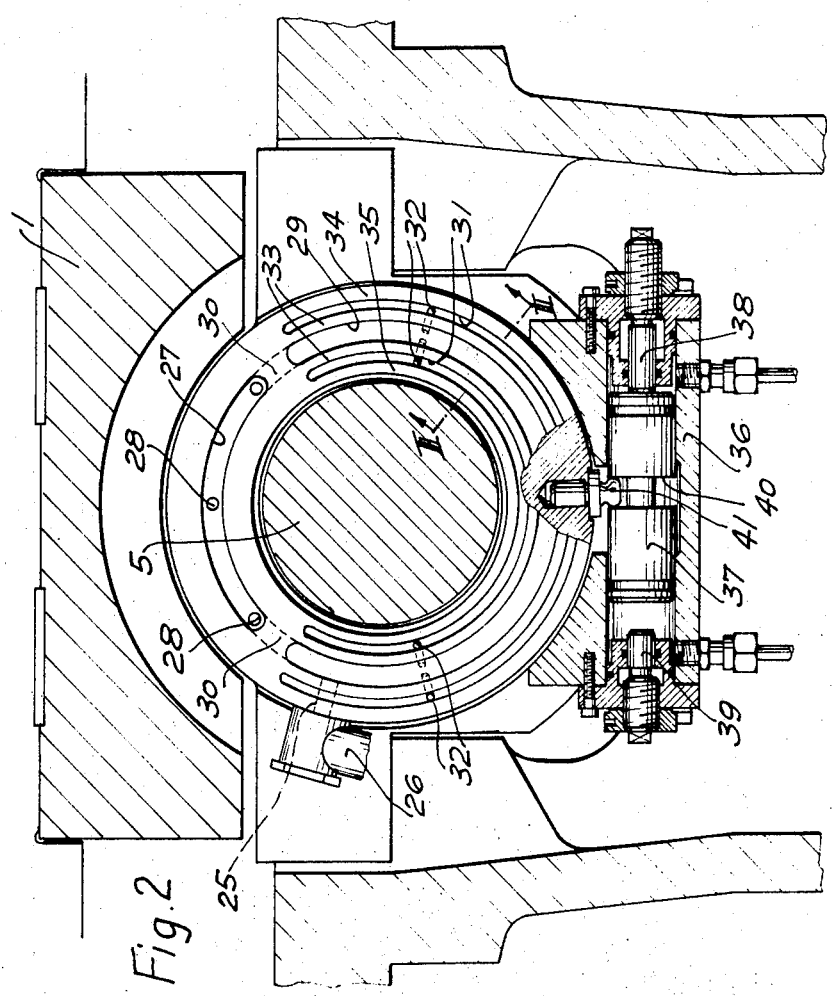

The figures show:

FIG. 1: an axial section through a worm and a worm rack with the hydrostatic lubricating device;

FIG. 2: a cross-section along the line II—II of FIG. 1;

FIG. 3: a part-section along the line III—III of FIG. 2 on an enlarged scale.

FIG. 4: a circuit diagram for the control of holding bodies;

FIG. 5: a semi-diagrammatic illustration of the complete gear with hydrostatic lubricating device.

The hydrostatic lubricating device according to the invention can be applied to gears consisting of a worm rack and a worm, as well as to those with two worms coaxially arranged in series. When only one worm is provided, as is the case with the gear according to the publication mentioned above, the worm has lubricating-oil borings in its two worm racks which are differently directed. The lubricating-oil borings of the flanks pointing in one direction are supplied via a distributor ring on one front face of the worm, whereas the lubricating-oil borings pointing in the opposite direction are supplied by a second distributor ring on the other front face of the worm.

In contrast thereto, there is described in the exemplified embodiment an arrangement of two worms mounted coaxially in series, of which only one worm has a driving effect in each operational direction whilst the other worm has a certain counter-holding effect; this is important in the case of varying loads. If, for example, the worm rack 1 mounted on the table 2 of a milling machine is shifted towards the right, the worm 3 has a driving effect, whilst the worm 3' has a counter-holding effect, and vice versa. As can be seen from FIG. 5, in particular, each of the worms 3 and 3' is connected to a cogwheel 4, 4'. The two cogwheels 4 and 4' are driven via the further cogwheels shown in FIG. 5 in the same sense of rotation and with the same number of revolutions. Since the whole arrangement is mirror-inverted along the line S—S, the other figures and the description deal only with the left-hand half of the arrangement, and these explanations apply analogously to the right-hand half.

The worm 3 is firmly connected to the worm shaft 5 or it is integrated with the latter. The worm shaft 5 is fixed in the gearbox 10 via the radial bearings 6 and 7 and the thrust bearings 8 and 9. The worm 3 has several lubricating-oil borings 11 which are evenly distributed over the circumference and open up in the flanks 12 directed towards the right. (In the mirror-inverted second worm 3' the lubricating-oil borings are likewise mirror-inverted and therefore open up in the flanks of the second worm 3' directed towards the left.) Known capillary throttles 13 are inserted in the lubricating-oil borings. These capillary throttles prevent a pressure compensation between the flank sections of the worm which are engaged in or entering the worm rack, and they also prevent the lubricating oil from leaking from the sections which are not engaged.

The lubricating-oil borings 11 are connected to several concentric distributor channels 14, which are sealed at the right-hand front face of the worm by stoppers 15. The left-hand front face 16 of the worm 3 is planar with regard to the worm shaft 5 and the distributor ring 17 rests against it. Between the distributor ring 17 and the thrust bearing 9, there is also provided a guard ring 18 which, in the illustrated example, is supported via a further thrust bearing 19 by the part 10 connected to the gear box. The holding body 18 could also be firmly connected to the gear box. In the illustrated example, however, it rotates to a limited extent in relation to the gear box casing for reasons which will be explained further below.

On the side facing the distributor ring 17, the holding body 18 has an annular groove 20 in which the distributor ring 17 engages with a ring lug 21 provided on its back side, so that it can be axially shifted. The ring lug 21 is sealed against the annular groove 20 via two circumferential joints 22.

As can be seen from FIGS. 2 and 3, several cap springs 23 are arranged between the annular groove 20 and the ring lug 21 and these are held by locking bolts 24. The locking bolts 24 can simultaneously also engage in the distributor ring 17 and thus prevent it from being twisted in relation to the holding body 18. Only one of these cap spring arrangements is shown in the drawing, several, for example 6, being uniformly distributed over the circumference. The cap springs press the distributor ring 17 against the front face 16 of the worm 3, even if no oil pressure is present in the annular groove 20. This prevents the lubricating oil from leaking between the distributor ring 17 and the front face 16 in the oil pressure-less state or when the admission of pressure oil starts. The supply of lubricating oil to the annular groove 20 takes place via a radial boring 25 [FIG. 2] and a flexible hose 26.

On the front side of the distributor ring 17 facing the front surface 16 there is provided the distributor groove 27 which extends over a sector of the ring formed by the effective part of the worm rack and the worm axis. In the illustrated example this angle amounts to about 94°. The distributor groove 27 is connected to the annular groove 20 via one or more axial borings 28.

On the front side of the distributor 17 there is also provided a filling groove 29 which, however, has no connection to the annular groove 20. The filling groove 29 extends over the sector of the ring in which the worm flanks are not engaged in the worm rack. Between the distributor groove 27 and the filling groove 29 there is a fairly wide bridge 30; in the further versions this is referred to as a "control reflector." The distributor groove 27 and the filling groove 29 are arranged on the same diameter as the distributor channels 14. They are therefore connected to the latter.

Relief grooves 31 are arranged concentrically to the filling groove 29, and these are likewise connected to the annular groove 20 via borings 32. In the illustrated example, the three concentric grooves 29 and 31 extend over a sector of the ring of about 240°. In their hydrostatically effective cross-section, i.e. the surface of the groove concerned and the adjacent escape surface, they are adjusted together with the filling groove 29 in such a way that the effective axial pressure resulting in every state of operation runs through the centre of the axis. Tilting of the distributor ring which is pressed against the front surface 16 of the worm 3 by the pressure prevailing in the annular groove 20 and the prssure of the cap springs 23 is thus obviated and a flat position of the distributor ring against the front surface 16 is thus ensured.

The relief grooves 31 and the filling groove 29 are moreover so arranged and designed that the lubricating oil overflows from the relief grooves 31 via the small lubricating oil slot present between the front surface 16 and the distributor ring 17 into the filling groove 29. This is indicated in FIG. 3 by means of the arrows. In order to make this overflow possible, the width of the bridges remaining between the relief grooves 31 and the filling groove 29 is smaller than the width of the bridges between the relief grooves 31 and the outer or inner circumference of the distributor ring 17. The proportion of oil overflowing from the relief grooves 31 into the filling groove 29 suffices in combination with the capillary throttles 13 to keep the distributor channels 14 and the lubricating-oil borings 11 filled with oil. It would also be possible to provide, instead of two, only one relief groove, the cross section thereof and the remaining bridge between the relief groove and the filling groove being suitably dimensioned. Thus, the pressure of the oil varies between a high pressure when the distributor channels 14 are connected in circuit with the annular groove 20 and a low pressure when the distributor channels 14 are connected through the oil slot between front face 16 and the distributor ring 17 to the high pressure oil in the relief grooves 31.

In a further development of the idea of the invention, the holding body 18 is so arranged that it rotates to a limited degree in relation to the gear box 10. The control device shown in FIGS. 2 and 4 serves for rotating the holding body. In a control casing 36 there is arranged a piston 37 of dual action, which can be hydraulically shifted against the adjustable stops 38, 39. A finger 41 connected to the guard ring engages in a groove 40 of the control piston 37. The switching device shown in FIG. 4 serves for operating the control piston 37. The rotating ability of the guard ring 18 is necessary in order to ensure a faultless hydrostatic lubrication when the worm runs at high speed. The lubricating oil, namely, requires a certain time of flow between entering into the distributor channel 14 and leaving at the orifices of the lubricating-oil borings 11. The higher the number of revolutions of the worm, the earlier the distributor channel concerned must come within the range of the distributor groove 27. At a higher number of revolutions of the worm corresponding to quick traverse, the guard ring 18 is deviated together with the distributor ring 17 in the direction of rotation opposite to that of the driving worm.

FIG. 4 shows the distributor rings 17 and 17' of the two worms 3 and 3' in quick traverse position. In the case of normal advance, the control pistons 37 and 37' are brought into a different final position so that the distributor rings 17, 17' take up the position marked as a dash-dot line. At one direction of rotation of the two worms 3, 3', the distributor rings 17, 17' are twisted in relation to each other. With this type of twisting of the distributor rings, the distributor ring of the worm having a counter-holding effect is deviated in the direction of rotation of that worm. The oil supply to the counter-holding worm is therefore somewhat delayed. However, this is of no importance in the case of the counter-holding worm. On the other hand, the result is that in the case of reversing operation with tipping switch, the distributor rings need not be switched over. The distributor rings for the driving worm are always in the correct operational position without any timelag caused by the switching over of the control pistons.

Instead of twisting the guard ring together with the distributor ring, the distributor ring could also be rotated by itself. The rotary motion of the guard ring or the distributor ring can also be carried out by pneumatic, electromagnetic or mechanical means. The diversion of the distributor rings can also be adjusted continuously as a function of the number of revolutions of the worm by means of a moving coil armature or the like. It is also conceivable to carry out an additional turn of the control reflector as a function of the viscosity of the oil which depends on the temperature. For this purpose, a temperature dependent corrective voltage is supplied to the automatic control system for the moving coil armature.

The embodiment of the invention in which an exclusive property or privilege is claimed are defined as follows:

1. A cylindrical worm and worm rack having meshes therein, a hydrostatic lubricating device wherein oil is supplied to the meshes under pressure via lubricating-oil borings uniformly distributed over the circumference of said worm, said worm having a plurality of concentric distributor channels which are connected to said lubricating-oil borings opening at one end at the teeth of said worm and at the other end an axially facing front surface of said worm, distributor ring means being axially supported by a gearbox and includes a distributor groove which extends over a limited sector of said distributor ring means and opens towards the front of said worm, said distributor ring means having a filling groove extending over the remaining sector of said distributor ring means which are in communication with the lubricating oil supply through a plurality of axial borings. comprising the improvement wherein:
   a. said distributor ring means slidingly engages said worm and is positioned concentrically to a worm shaft supporting said worm and is pressed against a front planar surface on said worm;
   b. an annular holding body concentrically surrounds said worm shaft and is axially supported by said gearbox and has an annular groove therein in which said distributor ring means engages with a ring lug so that it is axially shiftable and sealed;
   c. a plurality of cap springs being provided between said annular groove and said ring lug;
   d. at least one of said axial borings between said annular groove and said distributor groove being provided on the front side of said distributor ring means; and
   e. means defining at least one further boring between said annular groove and at least one relief groove extending concentrically to said filling groove over said sector of of said distributor ring means.

2. The improvement according to claim 1, wherein the width of a bridge defined by the space between said relief groove and said filling groove is smaller than the width of a bridge defined by the space between said relief groove and an outer edge of said distributor ring means.

3. The improvement according to claim 1, including a pair of relief grooves; and
   wherein said relief grooves are concentrically arranged at either side of said filling groove.

4. The improvement according to claim 1, wherein at least one of said holding body and said distributor ring means are so arranged that they can rotate to a limited extent in relation to said gearbox.

5. The improvement according to claim 4, wherein for rotating at least one of said holding body and said distributor ring means, there is provided a control device which, at quick traverse, shifts said distributor ring means connected to the operating flanks in the direction opposite to the direction of rotation of the corresponding worm, and shifts the other of said holding body and said distributor ring means assigned to the other flank in the opposite direction.

6. The improvement according to claim 5, wherein for rotating at least one of said holding body and said distributor ring means, there is provided a control device which, at quick traverse, shifts said distributor ring means connected to the operating flanks in the direction opposite to the direction of rotation of the corresponding worm, and shifts the other of said holding body and said distributor ring means assigned to the other flank in the opposite direction.

7. The improvement according to claim 1, wherein two worms are coaxially arranged in series; wherein said lubricating-oil borings of one worm open up only at the flanks facing in one direction, while the other worm is provided with lubricating-oil borings which open up only at the flanks facing in the opposite direction; and
   wherein said distributor ring means is provided at that front surface of each worm which is averted from the orifices of the lubricating-oil borings.

8. The improvement according to claim 1 wherein said holding body and said distributor ring means are so arranged that they can rotated to a limited extent in relation to said gearbox.

9. In a cylindrical worm and worm rack having meshes therein, a hydrostatic lubricating device wherein pressurized oil is supplied from a source to the meshes between the engaging worm teeth and the teeth of the worm rack through means defining lubricating oil borings uniformly distributed over the circumference of said worm and which open outwardly at one end at the flanks of the worm teeth and at the other end at an axially facing front face of said worm, the improvement comprising:
   an annular distributor ring means slidably engaging said front face of said worm and means for urging said distributor ring means into engagement with said face, said distributor ring means having a distributor groove in a face thereof extending over a first arcuate portion thereof and a filling groove in said face extending over a second arcuate portion thereof, said distributor groove being connected in a first fluid circuit with a first number of said lubricating-oil borings which open outwardly at said meshes, said filling groove being connected in a second fluid circuit with said source and a second number of said lubricating-oil borings which open outwardly at locations other than said meshes, said second fluid circuit comprising a pair of arcuate grooves in said face of said distributor ring means straddling said filling groove and means defining passageways connecting each of said arcuate grooves to said source of pressurized oil, said pressurized oil passing through a small gap between said face of said distributor ring means and said face of said worm to said filling groove and said second number of said lubricating-oil borings, a pressure drop occurring across said small gap so that oil entering said filling groove and said second number of said lubricating-oil borings is at a relatively low pressure to keep said second number of said lubricating-oil borings filled with oil while the flanks associated therewith are out of meshing engagement with said teeth of said worm rack, said pressurized oil in said distributor groove and said pair of arcuate grooves being balanced so that said face of said distributor ring means is parallel to said face of said worm.

* * * * *